US012617483B2

(12) United States Patent
Fu

(10) Patent No.: US 12,617,483 B2
(45) Date of Patent: May 5, 2026

(54) AUXILIARY WHEEL INSTALLATION BRACKET

(71) Applicant: Shanghai Smarty's Intelligent Technology Co., Ltd., Shanghai (CN)

(72) Inventor: Jingrong Fu, Shanghai (CN)

( * ) Notice: Subject to any disclaimer, the term of this patent is extended or adjusted under 35 U.S.C. 154(b) by 436 days.

(21) Appl. No.: 18/338,286

(22) Filed: Jun. 20, 2023

(65) Prior Publication Data

US 2024/0351651 A1    Oct. 24, 2024

(30) Foreign Application Priority Data

Apr. 23, 2023    (CN) .......................... 202310438324.2

(51) Int. Cl.
B62H 7/00          (2006.01)
(52) U.S. Cl.
CPC ..................................... B62H 7/00 (2013.01)
(58) Field of Classification Search
CPC ..................................... B62H 7/00; B62H 1/12
See application file for complete search history.

(56) References Cited

U.S. PATENT DOCUMENTS

| | | | | |
|---|---|---|---|---|
| 1,183,209 A | * | 5/1916 | Kligman ................... | B62H 7/00 280/304 |
| 1,241,423 A | * | 9/1917 | Myrie ....................... | B62H 7/00 280/304 |
| 2,509,937 A | * | 5/1950 | Olson ....................... | B62H 7/00 280/303 |
| 2,601,994 A | * | 7/1952 | Richman ................... | B62H 1/12 280/304 |
| 2,612,388 A | * | 9/1952 | Mcneill ..................... | B62H 7/00 280/47.32 |
| 2,647,764 A | * | 8/1953 | Paul, V ..................... | B62H 1/12 280/293 |
| 2,682,418 A | * | 6/1954 | Honig ....................... | B62H 7/00 280/304 |
| 2,712,947 A | * | 7/1955 | Pawsat ..................... | B62H 1/12 280/293 |
| 2,715,033 A | * | 8/1955 | Fogarty .................... | B62H 7/00 280/304 |
| 2,752,169 A | * | 6/1956 | Abel ......................... | B62H 7/00 280/165 |
| 2,776,845 A | * | 1/1957 | Pearl ........................ | B62H 7/00 301/124.1 |
| 2,784,008 A | * | 3/1957 | Pearl ........................ | B62H 7/00 280/304 |
| 2,793,877 A | * | 5/1957 | Meier, Jr. ................. | B62H 1/12 280/293 |

(Continued)

*Primary Examiner* — Valentin Neacsu
*Assistant Examiner* — Michael R Stabley

(57)                    ABSTRACT

An auxiliary wheel installation bracket, which is installed on the rear wheel of a bicycle, comprising a fixed installation part and an adjustable installation part detachably connected with the fixed installation part. The fixed installation part includes a first installation part corresponding to the rear lower fork rod of the rear wheel of the bicycle, a second installation part corresponding to the rear upper fork rod of the rear wheel of the bicycle, and a third installation part connected to the adjustable installation part. The adjustable installation part includes a fourth installation part clamped with the third installation part. The fourth installation part includes an auxiliary wheel connecting bracket extending toward the outside of the bicycle.

7 Claims, 7 Drawing Sheets

(56)        References Cited

U.S. PATENT DOCUMENTS

| | | | | |
|---|---|---|---|---|
| 2,828,141 | A * | 3/1958 | Tennes, I ................. | B62H 1/12 |
| | | | | 280/304 |
| 5,707,069 | A * | 1/1998 | Plana ....................... | B62H 1/12 |
| | | | | 280/298 |
| 9,475,532 | B2 * | 10/2016 | Di Vitto ................... | B62H 1/10 |
| 9,771,029 | B2 * | 9/2017 | Lytle ........................ | B62H 7/00 |
| 10,059,395 | B2 * | 8/2018 | Ahmed .................... | B62H 7/00 |
| 10,577,039 | B2 * | 3/2020 | Khouri ..................... | B62H 1/12 |
| 11,465,701 | B2 * | 10/2022 | Soza ........................ | B62H 1/12 |
| 2017/0334496 | A1 * | 11/2017 | Di Vitto .................. | B62H 7/00 |
| 2020/0156723 | A1 * | 5/2020 | Booker, Jr .............. | B62H 1/12 |
| 2022/0371677 | A1 * | 11/2022 | Karan ................... | A63B 69/16 |

* cited by examiner

AUXILIARY WHEEL INSTALLATION BRACKET

1. TECHNICAL FIELD

The invention relates to the technical field of bicycle accessories, in particular to an auxiliary wheel installation bracket.

2. BACKGROUND ART

A bicycle is generally composed of a rear wheel and a front wheel, but due to the double-wheel design of the bicycle, there is a risk of falling and injury for beginners who may find it difficult to control balance at their first attempt. Therefore, some special bicycles, such as children's bicycles or bicycles intended for beginners, need to be equipped with auxiliary wheels on the rear wheel of the bicycle to ensure that they do not fall easily and get injured when riding. For example, the utility model with the publication number CN208248346U discloses a kind of auxiliary wheel for bicycles. It connects the rolling wheels through a connecting rod, and connects the auxiliary wheels to the axle of the rear wheel of the bicycle. This structure that is only connected to the bicycle through a fixing piece may easily lead to unstable connection of the auxiliary wheels, low angle of the auxiliary wheels. Additionally, it cannot adjust the height of the auxiliary wheels, cannot adapt to different types of bicycles, and fails to meet users' needs.

3. SUMMARY OF THE INVENTION

To solve the above technical problem, the invention provides a technical scheme: an auxiliary wheel installation bracket, which is installed on the rear wheel of a bicycle, comprising a fixed installation part and an adjustable installation part detachably connected with the fixed installation part. The fixed installation part includes a first installation part corresponding to the rear lower fork rod of the rear wheel of the bicycle, a second installation part corresponding to the rear upper fork rod of the rear wheel of the bicycle, and a third installation part connected to the adjustable installation part. The adjustable installation part includes a fourth installation part clamped with the third installation part. The fourth installation part includes an auxiliary wheel connecting bracket extending toward the outside of the bicycle.

As a preferred embodiment, the first installation part includes a strip-shaped installation plate arranged on the outside of the rear lower fork rod of the rear wheel of the bicycle and first U-shaped connectors arranged on the inner side of the rear lower fork rod of the rear wheel of the bicycle. The end of the strip-shaped installation plate away from the front wheel of the bicycle is connected to the third installation part. The first U-shaped connectors are sleeved on the rear lower fork rod of the rear wheel of the bicycle, and are detachably connected to the strip-shaped installation plate.

As a preferred embodiment, the number of the first U-shaped connectors is at least two. The two ends of the strip-shaped installation plate are respectively provided with installation holes corresponding to the first U-shaped connectors. The ends of the first U-shaped connectors are provided with threaded segments. After the first U-shaped connectors pass through the installation holes, they are fixed to the strip-shaped installation plate through nuts.

As a preferred embodiment, the second installation part includes an arc-shaped installation plate connected between the upper part of the first installation part and the third installation part. The arc-shaped installation plate is arranged on the outer side of the rear upper fork rod of the rear wheel of the bicycle. A second U-shaped connector is arranged on the inner side of the rear upper fork rod of the rear wheel of the bicycle. The second U-shaped connector is sleeved on the rear upper fork rod of the rear wheel of the bicycle, and is detachably connected with the arc-shaped installation plate.

As a preferred embodiment, the structure of the second U-shaped connector is the same as that of the first U-shaped connector. An arc-shaped installation channel is arranged on the surface of the arc-shaped installation plate along its arc direction.

As a preferred embodiment, the third installation part includes a side installation plate extending to the outside of the rear wheel of the bicycle and a docking installation plate connected to the side installation plate and extending away from the front wheel of the bicycle. The end of the docking installation plate away from the side installation plate is provided with an auxiliary installation plate extending toward the inner direction of the rear wheel of the bicycle. Several adjustment holes are arranged from top to bottom on the docking installation plate to connect with the fourth installation part.

As a preferred embodiment, the fourth installation part includes a main installation plate covering the outside of the docking installation plate. The two sides of the main installation plate are respectively provided with sub installation plates corresponding to the installation directions of the side installation plate and the auxiliary installation plate. The surface of the main installation plate is provided with several connection holes corresponding to the adjustment holes from top to bottom. The connection holes are connected to the adjustment holes through fixing bolts. The auxiliary wheel connecting bracket is connected to the main installation plate.

As a preferred embodiment, on the side of the docking installation plate away from the main installation plate, reinforcement plates are vertically arranged on the portions located on both sides of the adjustment holes.

As a preferred embodiment, the auxiliary wheel connecting bracket includes a transverse connecting shaft connected to the outside of the main installation plate. The end of the transverse connecting shaft away from the main installation plate is downwardly provided with a third U-shaped connector. The bottom of the third U-shaped connector is arranged with installation blocks for connecting with the auxiliary wheel.

Compared with the prior art, the invention has the following advantages: The invention can adjust installation height of the auxiliary wheels according to needs by setting the fixed installation part and the adjustable installation part, the docking of the two parts, and the design of multi-connection holes, which is convenient to use. By setting the first installation part corresponding to the rear lower fork rod of the rear wheel of the bicycle and the second installation part corresponding to the rear upper fork rod of the rear wheel of the bicycle, the connecting part between the auxiliary wheels and the bicycle can be increased, and the stability of the auxiliary wheels can be increased.

4. BRIEF DESCRIPTION OF ACCOMPANY DRAWINGS

5. SPECIFIC EMBODIMENT OF THE INVENTION

Figure 1:
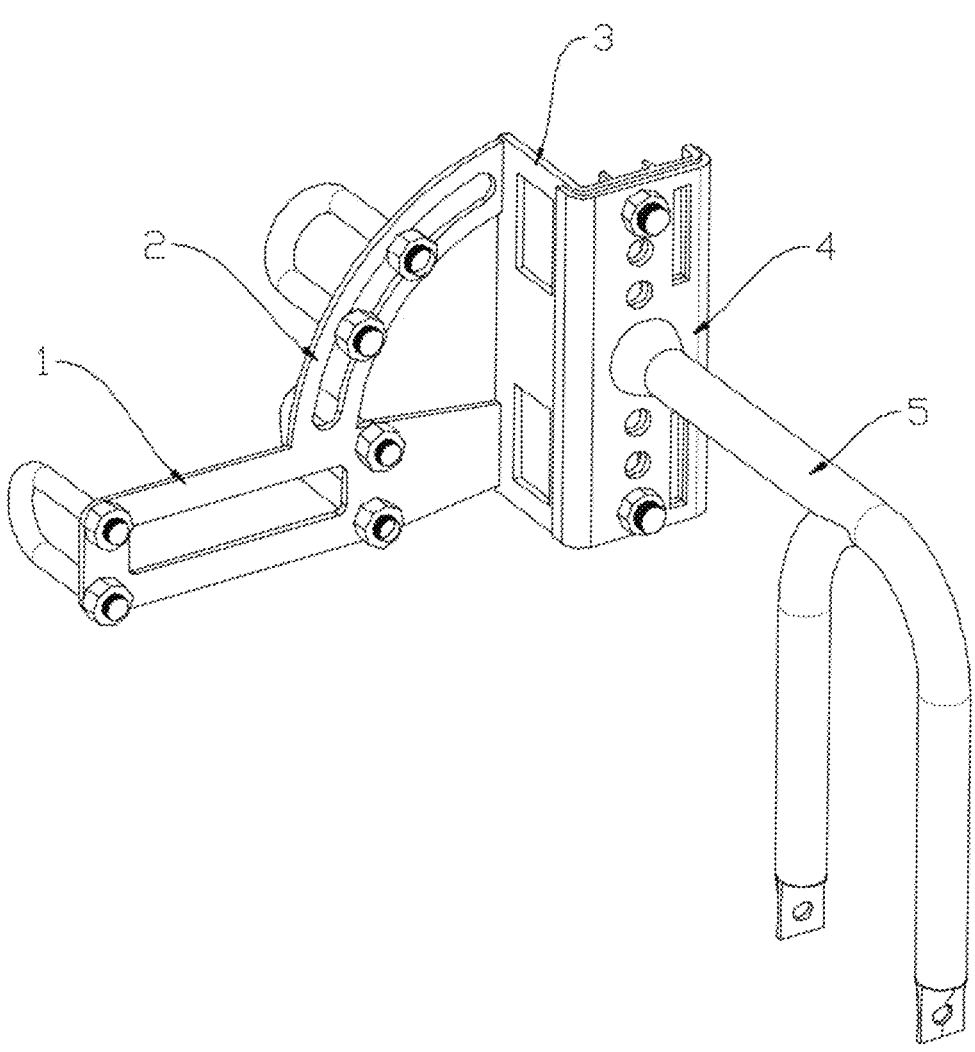
FIG. 1 is a schematic diagram of the front structure of an auxiliary wheel installation bracket of the invention.

In order to make the objects, technical schemes and advantages of the embodiments of the invention clearer, the technical schemes in the embodiments of the invention will be clearly and completely described below in combination with the accompanying drawings in the embodiments of the invention. Obviously, the described embodiments are some, but not all embodiments of the invention. The components of the embodiments of the invention generally described and illustrated in the drawings herein may be arranged and designed in a variety of different configurations.

In the description of the invention, it should be understood that the orientation or positional relationship indicated by the terms "center", "upper", "lower", "left", "right", "vertical", "horizontal", "inner", "outer" and so on are based on the orientation or positional relationship shown in the accompanying drawings, or the orientation or positional relationship that product of the invention is usually placed in when it is used, only for the convenience of describing the invention and simplifying the description, rather than indicating or implying that the indicated device or element must have a specific orientation, as well as a specific orientation structure and operation. Therefore, it should not be construed as a limitation of the invention. In addition, the terms of "first", "second", "third" and so on are only used to differentiate the description, and should not be construed as indicating or implying relative importance.

In addition, if the terms "horizontal", "vertical", "overhanging" and other terms appear, it does not mean that the component is required to be absolutely horizontal or overhanging, but can be slightly inclined. For example, "horizontal" simply means that its direction is more horizontal than "vertical", it does not mean that the structure must be completely horizontal, but can be slightly inclined.

In the description of the invention, "a plurality of" means at least two.

In the description of the invention, it should also be noted that the terms of "arrange", "install", "link", "connect", etc., should be generally understood unless there are specific restrictions or stipulations. For example, the "connect" may refer to fixed connection, detachable connection or integral connection; the "connect" may also refer to mechanical connection or electrical connection; the means of "connect"

may be directly connected or indirectly connected through an intermediate medium, and may be internal communication between the two elements. For those skilled in the art, the specific meaning of the above terms in the invention can be understood according to the specific situation.

Embodiment

Figure 2:
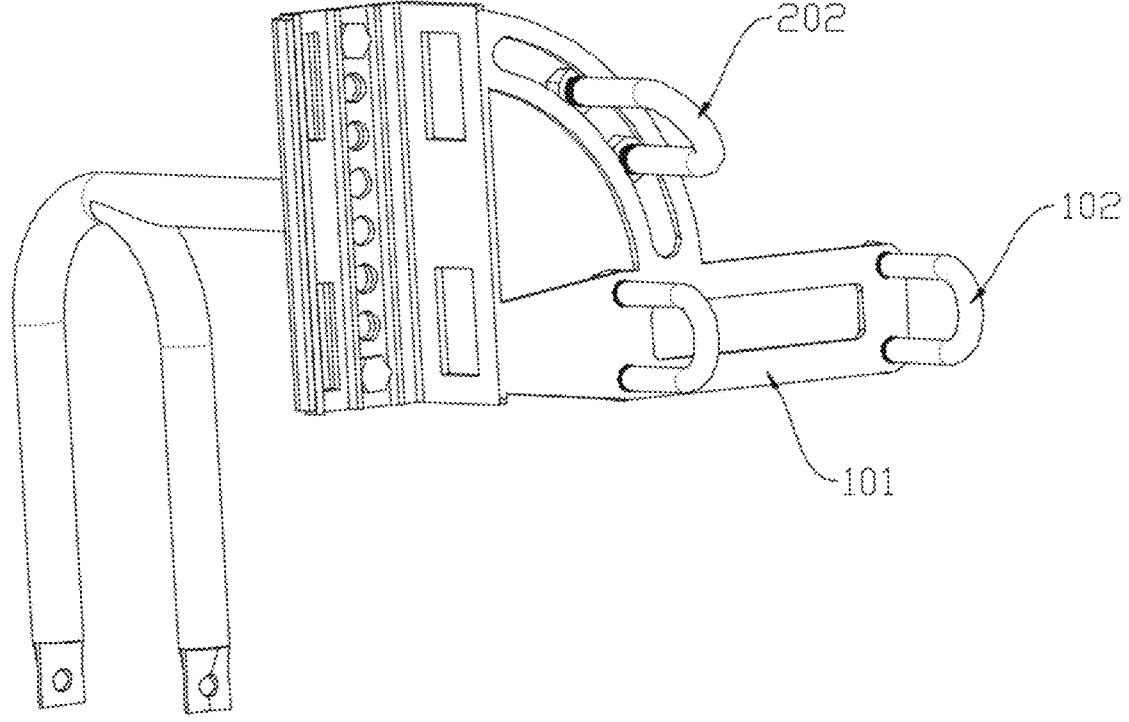
FIG. 2 is a schematic diagram of the rear structure of an auxiliary wheel installation bracket of the invention.
Figure 3:
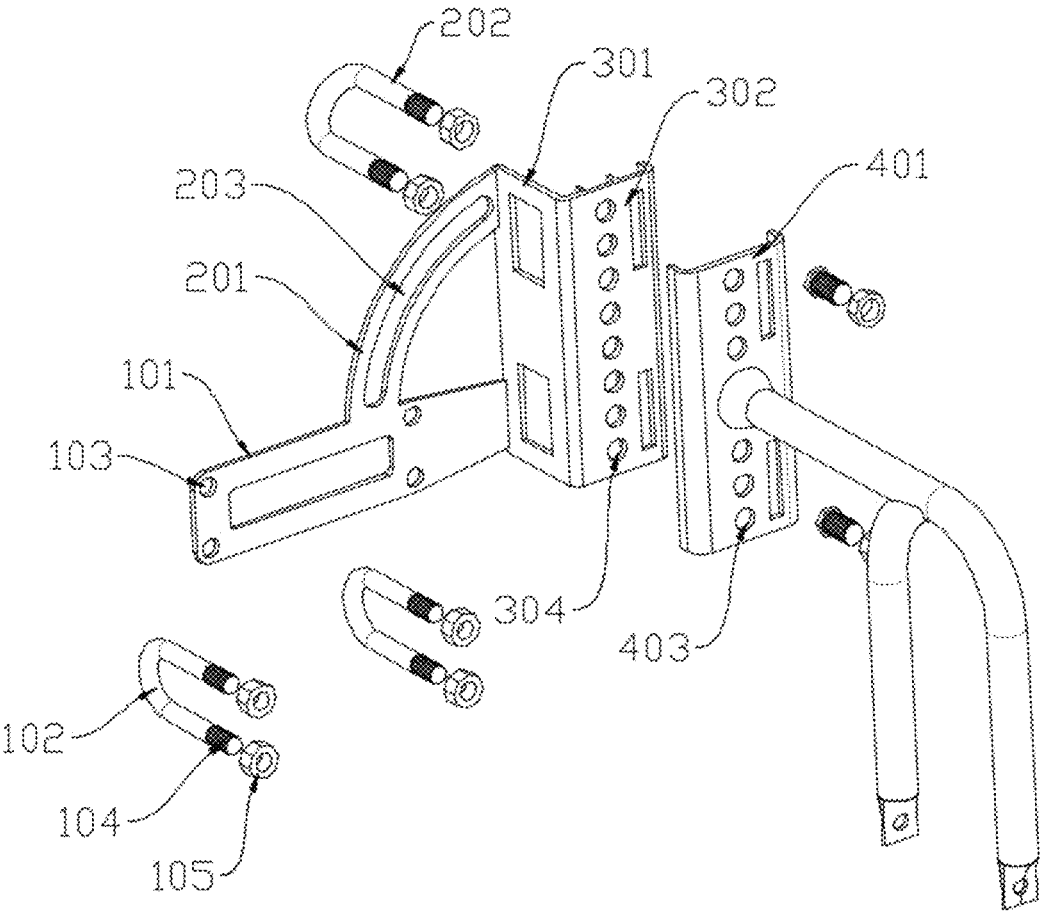
FIG. 3 is a schematic diagram of the disassembled structure of an auxiliary wheel installation bracket of the invention.
Figure 4:
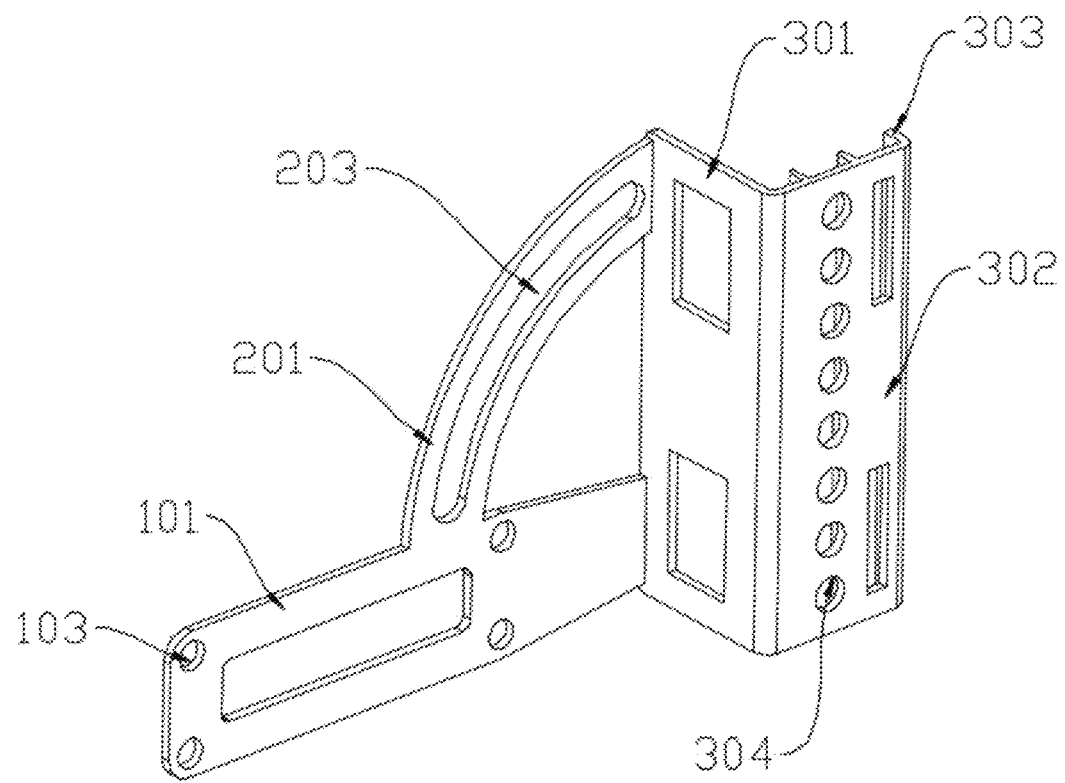
FIG. 4 is a schematic diagram of the first installation part in the auxiliary wheel installation bracket of the invention.
Figure 5:
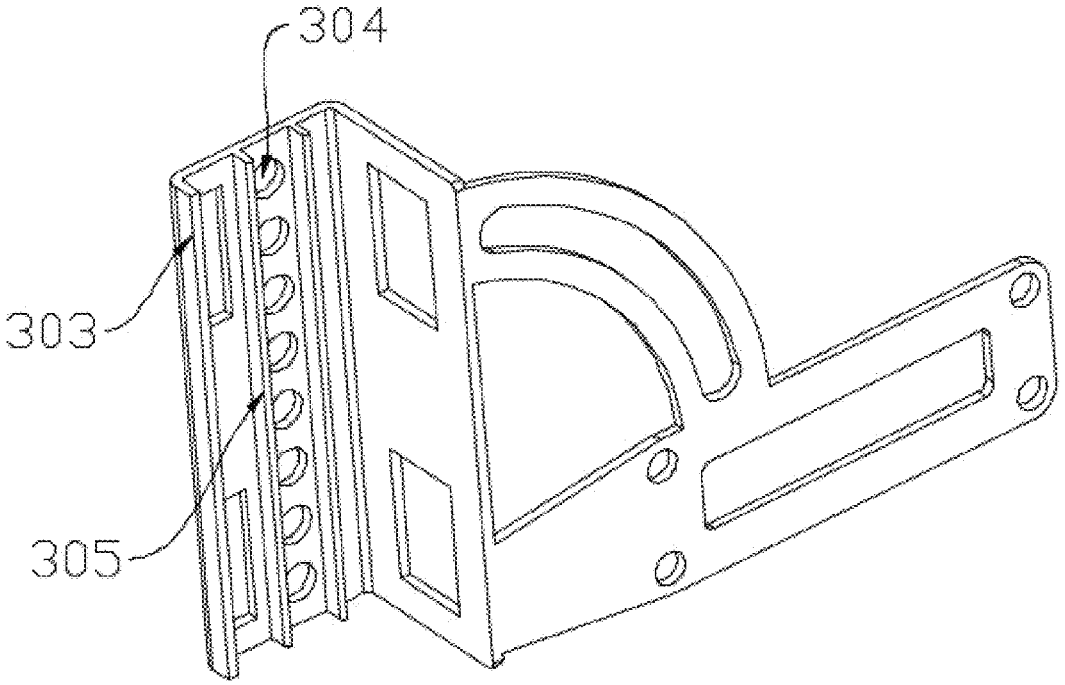
FIG. 5 is a schematic diagram of the rear structure of the second installation part in the auxiliary wheel installation bracket of the invention.
Figure 6:
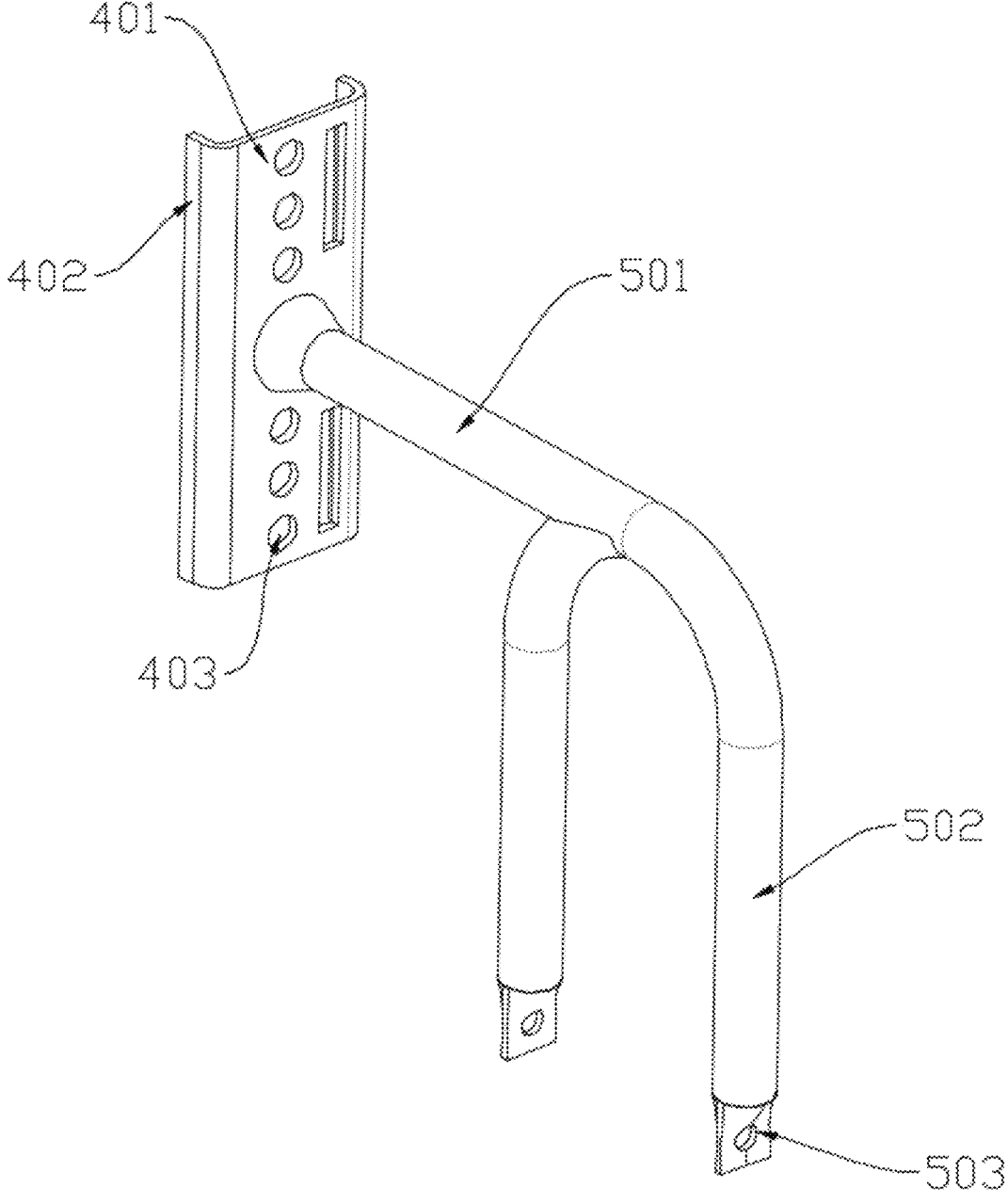
FIG. 6 is a schematic diagram of the fourth installation part in the auxiliary wheel installation bracket of the invention.
Figure 7:
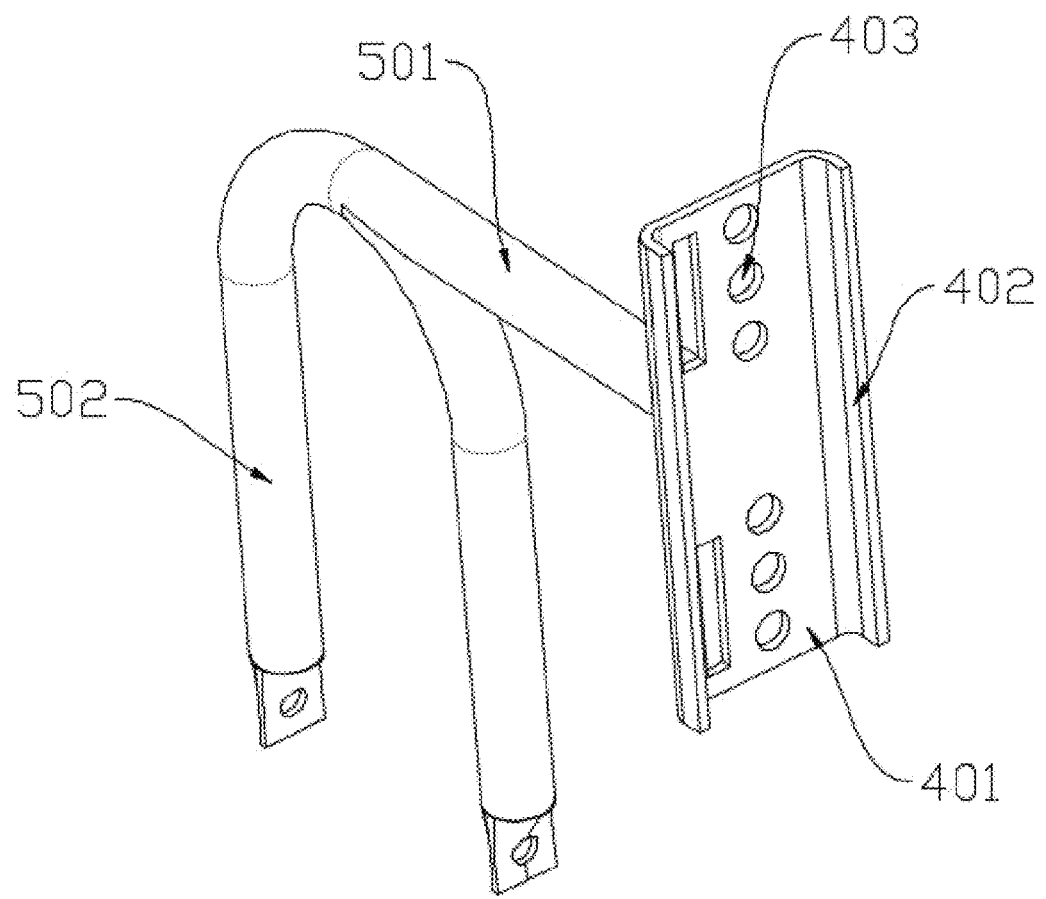
FIG. 7 is a schematic diagram of the rear structure of the third installation part in the auxiliary wheel installation bracket of the invention.
Figure 8:
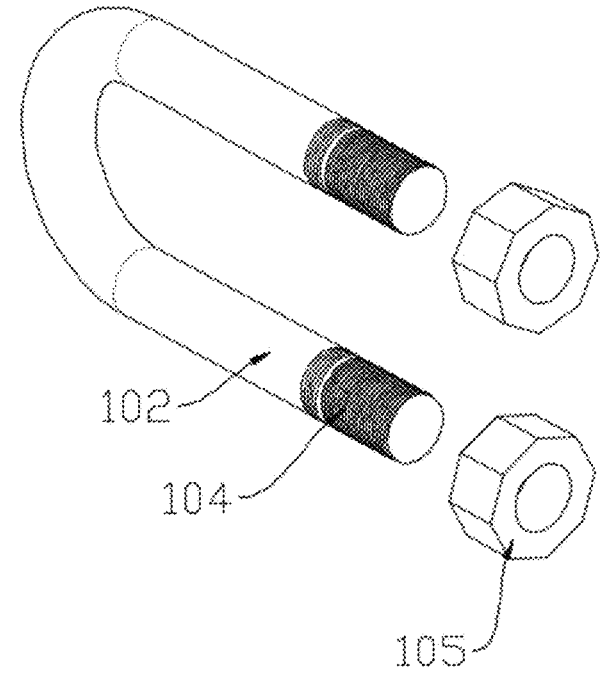
FIG. 8 is a schematic diagram of the first/second U-shaped connector in the auxiliary wheel installation bracket of the invention.
Figure 9:
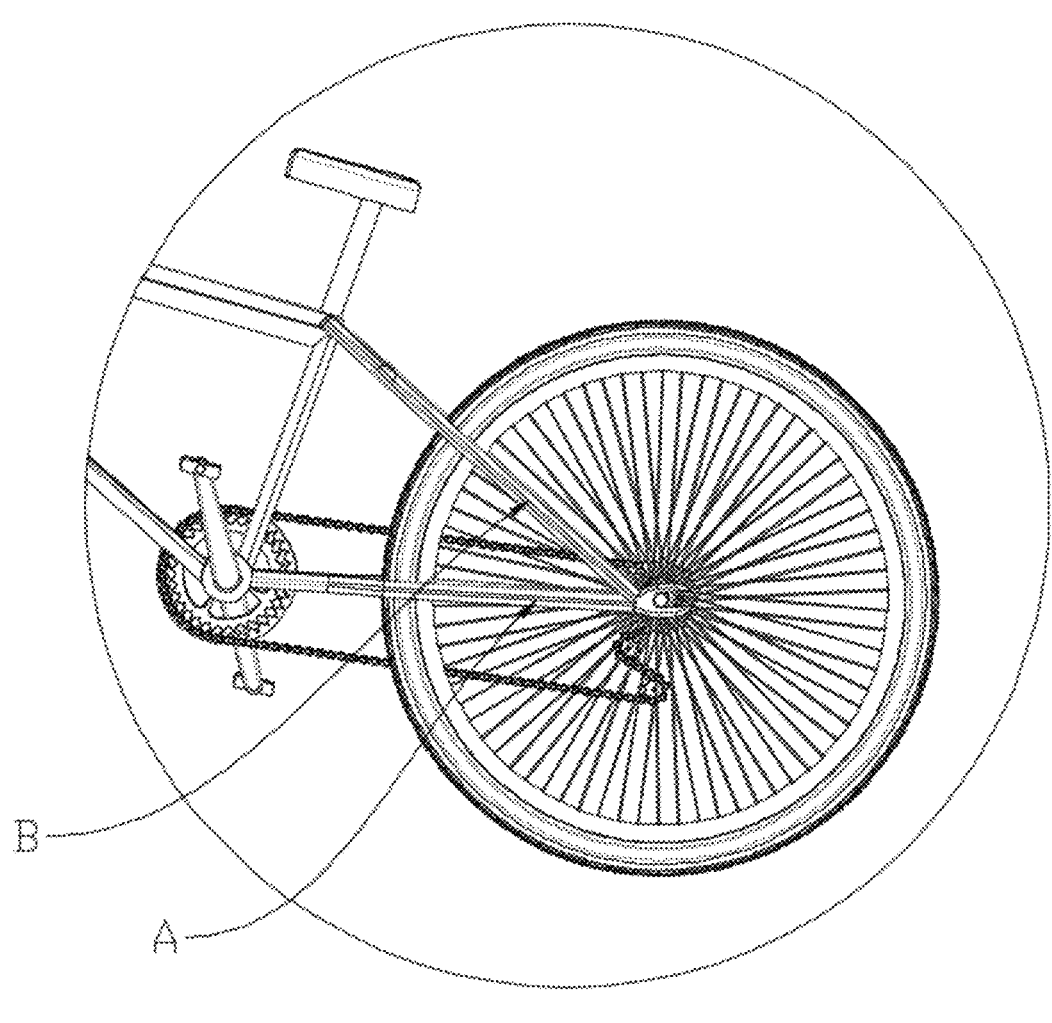
FIG. 9 is a schematic diagram of the rear wheel of a bicycle.

Combined with FIG. 1-9, the invention provides an auxiliary wheel installation bracket. Combined with FIG. 9, it is installed on the rear wheel of a bicycle, and comprises a fixed installation part and an adjustable installation part detachably connected with the fixed installation part. The fixed installation part includes a first installation part 1 corresponding to the rear lower fork rod A of the rear wheel of the bicycle, a second installation part 2 corresponding to the rear upper fork rod B of the rear wheel of the bicycle, and a third installation part 3 connected to the adjustable installation part. The adjustable installation part includes a fourth installation part 4 clamped with the third installation part 3. The fourth installation part 4 includes an auxiliary wheel connecting bracket 5 extending toward the outside of the bicycle.

The first installation part 1 includes a strip-shaped installation plate 101 arranged on the outside of the rear lower fork rod A of the rear wheel of the bicycle and first U-shaped connectors 102 arranged on the inner side of the rear lower fork rod A of the rear wheel of the bicycle. The end of the strip-shaped installation plate 101 away from the front wheel of the bicycle is connected to the third installation part 3. The first U-shaped connectors 102 are sleeved on the rear lower fork rod A of the rear wheel of the bicycle, and are detachably connected to the strip-shaped installation plate 101. The number of the first U-shaped connectors 102 is at least two. In this embodiment, the number of the first U-shaped connectors is two. The two ends of the strip-shaped installation plate 101 are respectively provided with installation holes 103 corresponding to the first U-shaped connectors 102. The ends of the first U-shaped connectors 102 are provided with threaded segments 104. After the first U-shaped connectors 102 pass through the installation holes 103, they are fixed to the strip-shaped installation plate 101 through nuts 105.

The second installation part 2 includes an arc-shaped installation plate 201 connected between the upper part of the first installation part 1 and the third installation part 3. The arc-shaped installation plate 201 is arranged on the outer side of the rear upper fork rod B of the rear wheel of the bicycle. A second U-shaped connector 202 is arranged on the inner side of the rear upper fork rod B of the rear wheel of the bicycle. The second U-shaped connector 202 is sleeved on the rear upper fork rod B of the rear wheel of the bicycle, and is detachably connected with the arc-shaped installation plate 201. The structure of the second U-shaped connector 202 is the same as that of the first U-shaped connector 102. An arc-shaped installation channel 203 is arranged on the surface of the arc-shaped installation plate 201 along its arc direction.

When installing the fixed installation part, first, passing the first U-shaped connectors through the rear lower fork rod A of the rear wheel of the bicycle; passing the second U-shaped connector through the rear upper fork rod B of the rear wheel of the bicycle; and then placing the strip-shaped installation plate and the arc-shaped installation plate outside the rear wheel of the bicycle (the strip-shaped installation plate and the arc-shaped installation plate are integrally formed); making the first U-shaped connectors pass through the installation holes on the strip-shaped installation plate and fixing them with nuts; making the second U-shaped connector pass through the arc-shaped installation channel on the arc-shaped installation plate and fixing it with nuts. The connection position of the second U-shaped connector and the arc-shaped installation channel can be adjusted, which can be adapted to different types of bicycles.

The third installation part 3 includes a side installation plate 301 extending to the outside of the rear wheel of the bicycle and a docking installation plate 302 connected to the side installation plate 301 and extending away from the front wheel of the bicycle. The end of the docking installation plate 302 away from the side installation plate 301 is provided with an auxiliary installation plate 303 extending toward the inner direction of the rear wheel of the bicycle. Several adjustment holes 304 are arranged from top to bottom on the docking installation plate 302 to connect with the fourth installation part 4.

The fourth installation part 4 includes a main installation plate 401 covering the outside of the docking installation plate 302. The two sides of the main installation plate 401 are respectively provided with sub installation plates 402 corresponding to the installation directions of the side installation plate 301 and the auxiliary installation plate 303. The surface of the main installation plate 401 is provided with several connection holes 403 corresponding to the adjustment holes 304 from top to bottom. The connection holes 403 are connected to the adjustment holes 304 through fixing bolts. The auxiliary wheel connecting bracket 5 is connected to the main installation plate 401. On the side of the docking installation plate 302 away from the main installation plate 401, reinforcement plates 305 are vertically arranged on the portions located on both sides of the adjustment holes 304.

After the installation of the fixed installation part is completed, installing the adjustable installation part on the fixed installation part, that is, mainly docking the main installation plate with the docking installation plate. According to the height of the auxiliary wheels to be installed, adjusting the installation positions of the main installation plate and the docking installation plate, then connecting and fixing the connection holes and adjustment holes of the corresponding positions through bolts.

The auxiliary wheel connecting bracket 5 includes a transverse connecting shaft 501 connected to the outside of the main installation plate 401. The end of the transverse connecting shaft 501 away from the main installation plate 401 is downwardly provided with a third U-shaped connector 502. The bottom of the third U-shaped connector 502 is arranged with installation blocks 503 for connecting with the auxiliary wheel. After the adjustable installation part is installed, installing the auxiliary wheels in the third U-shaped connector.

The invention and its embodiments are described above. This description is not restrictive. What is shown in the accompanying drawing is only one of the embodiments of the invention. The actual structure is not limited to this. All in all, if those skilled in the art receives its enlightenment, without deviating from the object of the invention, and without creatively designing structures and embodiments similar to the technical scheme of the invention shall fall within the protection scope of the invention.

The invention claimed is:

1. An auxiliary wheel installation bracket, which is installed on a rear wheel of a bicycle, comprising a fixed installation part and an adjustable installation part detachably connected with the fixed installation part, the fixed installation part includes a first installation part corresponding to a rear lower fork rod of the rear wheel of the bicycle, a second installation part corresponding to a rear upper fork rod of the rear wheel of the bicycle, and a third installation part connected to the adjustable installation part, the adjustable installation part includes a fourth installation part clamped with the third installation part, the fourth installation part includes an auxiliary wheel connecting bracket extending toward the outside of the bicycle; wherein the first installation part includes a strip-shaped installation plate arranged on the outside of the rear lower fork rod of the rear wheel of the bicycle and first U-shaped connectors arranged on the inner side of the rear lower fork rod of the rear wheel of the bicycle, the end of the strip-shaped installation plate away from a front wheel of the bicycle is connected to the third installation part, the first U-shaped connectors are sleeved on the rear lower fork rod of the rear wheel of the bicycle, and are detachably connected to the strip-shaped installation plate; wherein the number of the first U-shaped connectors is at least two, the two ends of the strip-shaped installation plate are respectively provided with installation holes corresponding to the first U-shaped connectors, the ends of the first U-shaped connectors are provided with threaded segments, after the first U-shaped connectors pass through the installation holes, they are fixed to the strip-shaped installation plate through nuts.

2. The auxiliary wheel installation bracket of claim 1, wherein the second installation part includes an arc-shaped installation plate connected between the upper part of the first installation part and the third installation part; the arc-shaped installation plate is arranged on the outer side of the rear upper fork rod of the rear wheel of the bicycle, the second U-shaped connector is arranged on the inner side of the rear upper fork rod of the rear wheel of the bicycle; the second U-shaped connector is sleeved on the rear upper fork rod of the rear wheel of the bicycle, and is detachably connected with the arc-shaped installation plate.

3. The auxiliary wheel installation bracket of claim 2, wherein a structure of the second U-shaped connector is the same as that of the first U-shaped connector, an arc-shaped installation channel is arranged on the surface of the arc-shaped installation plate along its arc direction.

4. The auxiliary wheel installation bracket of claim 2, wherein the third installation part includes a side installation plate extending to the outside of the rear wheel of the bicycle and a docking installation plate connected to the side installation plate and extending away from the front wheel of the bicycle, the end of the docking installation plate away from the side installation plate is provided with an auxiliary installation plate extending toward the inner direction of the rear wheel of the bicycle, several adjustment holes are arranged from top to bottom on the docking installation plate to connect with the fourth installation part.

5. The auxiliary wheel installation bracket of claim 4, wherein the fourth installation part includes a main installation plate covering the outside of the docking installation plate, the two sides of the main installation plate are respectively provided with sub installation plates corresponding to the installation directions of the side installation plate and the auxiliary installation plate, the surface of the main installation plate is provided with several connection holes corresponding to the adjustment holes from top to bottom, the connection holes are connected to the adjustment holes through fixing bolts, the auxiliary wheel connecting bracket is connected to the main installation plate.

6. The auxiliary wheel installation bracket of claim 5, wherein on the side of the docking installation plate away from the main installation plate, reinforcement plates are vertically arranged on the portions located on both sides of the adjustment holes.

7. The auxiliary wheel installation bracket of claim 4, wherein the auxiliary wheel connecting bracket includes a transverse connecting shaft connected to the outside of the main installation plate, the end of the transverse connecting shaft away from the main installation plate is downwardly provided with a third U-shaped connector, the bottom of the third U-shaped connector is arranged with installation blocks for connecting with the auxiliary wheel.

* * * * *